(12) United States Patent
Brisbin et al.

(10) Patent No.: US 11,358,880 B2
(45) Date of Patent: Jun. 14, 2022

(54) WATER PURIFICATION

(71) Applicant: LAWRENCE LIVERMORE NATIONAL SECURITY, LLC, Livermore, CA (US)

(72) Inventors: Ryan P. Brisbin, Merced, CA (US); Jenny Zhou, San Francisco, CA (US); Allan S. Chang, San Ramon, CA (US); Tiziana C. Bond, Livermore, CA (US); Aaron J. Simon, Pleasanton, CA (US); Lars Voss, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 124 days.

(21) Appl. No.: 16/944,886

(22) Filed: Jul. 31, 2020

(65) Prior Publication Data

US 2021/0039966 A1 Feb. 11, 2021

Related U.S. Application Data

(60) Provisional application No. 62/883,550, filed on Aug. 6, 2019.

(51) Int. Cl.
  *C02F 1/32* (2006.01)
  *C02F 1/72* (2006.01)
  *B01J 21/06* (2006.01)
  *B01J 35/00* (2006.01)
  (Continued)

(52) U.S. Cl.
  CPC ............ *C02F 1/325* (2013.01); *B01J 21/063* (2013.01); *B01J 35/004* (2013.01); *B01J 35/04* (2013.01); *B01J 35/065* (2013.01); *C02F 1/725* (2013.01); *C02F 2101/40* (2013.01); *C02F 2305/08* (2013.01); *C02F 2305/10* (2013.01)

(58) Field of Classification Search
  CPC ...... C02F 1/32; C02F 1/72; B01J 21/06; B01J 35/00; B01J 35/06; B01J 34/04
  See application file for complete search history.

(56) References Cited

U.S. PATENT DOCUMENTS

| 2013/0148194 | A1* | 6/2013 | Altug | ............... G02B 5/008 977/932 |
| 2016/0207789 | A1* | 7/2016 | Tang | ............... B01J 23/50 |
| 2019/0002317 | A1* | 1/2019 | Salah | ............... B01J 21/185 |

OTHER PUBLICATIONS

Asapu, et al., "W. Electron Transfer and Near-Field Mechanisms in Plasmonic Gold-Nanoparticle-Modified TiO2 Photocatalytic Systems," ACS Appl. Nano Mater., 2019, 2 (7), pp. 4067-4074.
(Continued)

*Primary Examiner* — Walter D. Griffin
*Assistant Examiner* — Cameron J Allen
(74) *Attorney, Agent, or Firm* — Eddie E. Scott

(57) ABSTRACT

Production of decontaminated water from contaminated water using a vessel, an inlet to the vessel wherein the contaminated water is introduced into the vessel, an outlet to the vessel wherein the decontaminated water is removed from the vessel, a plasmonic-photocatalyst membrane connected to the vessel, plasmonic nanoparticles or nanostructures connected to the plasmonic-photocatalyst membrane, and a source of ultraviolet light that directs ultraviolet light onto the vessel, the plasmonic-photocatalyst membrane, the plasmonic nanoparticles or nanostructures, and the contaminated water to produce the decontaminated water from the contaminated water.

8 Claims, 2 Drawing Sheets

(51) Int. Cl.
  *B01J 35/04* (2006.01)
  *B01J 35/06* (2006.01)

(56) References Cited

OTHER PUBLICATIONS

Brezová, et al., "Photocatalytic Degradation of P-Toluenesulphonic Acid in Aqueous Systems Containing Powdered and Immobilized Titanium Dioxide," J. Photochem. Photobiol. A Chem., 1994, 83 (1), pp. 69-75.
Cushing, et al., Photocatalytic Activity Enhanced by Plasmonic Resonant Energy Transfer from Metal to Semiconductor. J. Am Chem. Soc. 2012, 134 (36), pp. 15033-15041.
Dai, et al., "Photocatalytic Degradation of Methyl Orange in Aqueous Suspension of Mesoporous Titania Nanoparticles," Chemosphere, 2007, 69 (9), pp. 1361-1367.
Gomes da Silva, et al., "Photochemical and Photocatalytic Degradation of an Azo Dye in Aqueous Solution by UV Irradiation," J Photochem. Photobiol. A Chem., 2003, 155 (1-3), pp. 133-143.
Guo, et al., "Direct Growth of TiO2 Nanosheet Arrays on Carbon Fibers for Highly Efficient Photocatalytic Degradation of Methyl Orange," Adv. Mater. 2012, 24 (35), pp. 4761-4764.
Hao, et al, "Aluminum Plasmonic Photocatalysis," Sci. Rep., 2015, 5, pp. 1-7.
Honda, et al., "Efficient UV Photocatalysis Assisted by Densely Distributed Aluminum Nanoparticles." J. Phys. D. Appl. Phys. 2015, 48 (18), 184006, pp. 1-6.
Hou, et al., "Plasmonic Enhancement of Photocatalytic Decomposition of Methyl Orange under Visible Light," J. Catal. 2011, 277 (2), pp. 149-153.
Jani, et al., "Understanding the Effect of Plasmonic Enhancement on Photocatalytic Activity of TiO2 Nanotube Arrays," Mater. Charact. 2017, 128 (Nov. 2016), pp. 134-141.
Khatun, et al., "Plasmonic Enhanced Au Decorated TiO2 Nanotube Arrays as a Visible Light Active Catalyst towards Photocatalytic CO2 Conversion to CH4" J. Environ. Chem. Eng., 2019, 7 (6), 103233, pp. 1-10.
Lee, et al., "TiO2 Photocatalyst for Water Treatment Applications," J. Ind. Eng. Chem. 2013, 19 (6), pp. 1761-1769.
Li, et al., "Photocatalytic Degradation of Methyl Orange by TiO2-Coated Activated Carbon and Kinetic Study," Water Res., 2006, 40 (6), pp. 1119-1126.
Paramasivam, et al., "A Review of Photocatalysis Using Self-Organized TiO 2 Nanotubes and Other Ordered Oxide Nanostructures," Small 2012, 8 (20), pp. 3073-3103.
Tasaki, et al., "Degradation of Methyl Orange Using Short-Wavelength UV Irradiation with Oxygen Microbubbles," J. Hazard. Mater., 2009, 162 (2-3), pp. 1103-1110.
Vinodgopal, et al., "Enhanced Rates of Photocatalytic Degradation of an Azo Dye Using SnO2/TiO2 Coupled Semiconductor Thin Films," Environ. Sci. Technol., 1995, 29 (3), pp. 841-845.
Wang, et al., "Wavelength-Sensitive Photocatalytic Degradation of Methyl Orange in Aqueous Suspension over Iron(III)-Doped TiO2 Nanopowders under UV and Visible Light Irradiation," J. Phys. Chem. B, 2006, 110 (13), pp. 6804-6809.

\* cited by examiner

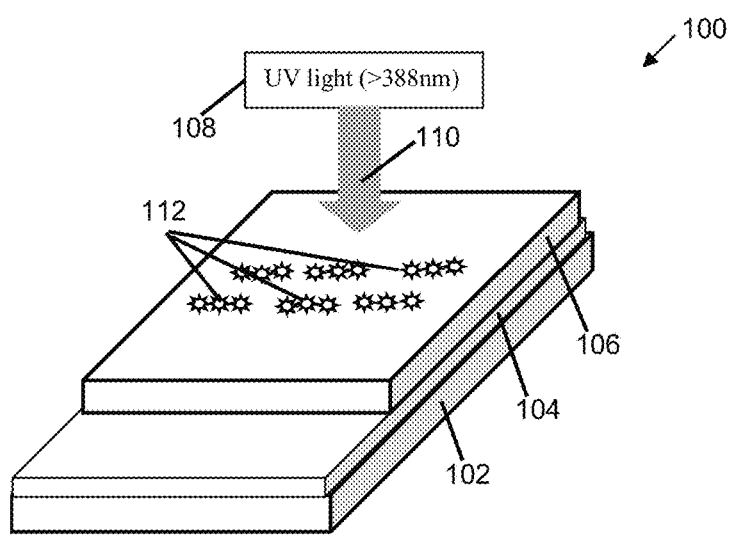
FIG. 1
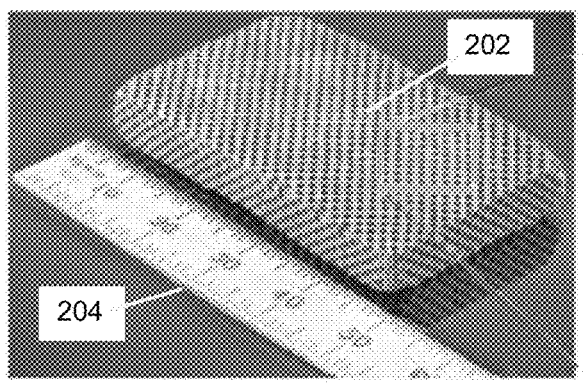
FIG. 2A
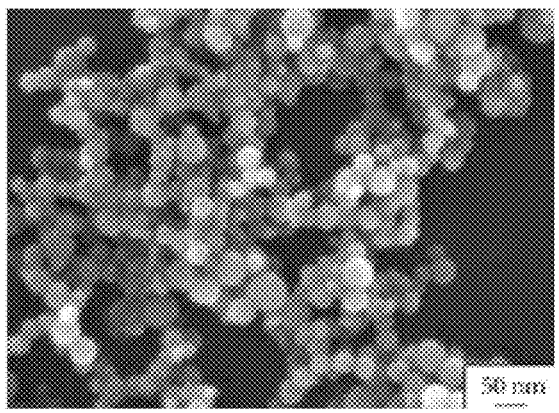
FIG. 2B
  
FIG. 2C  FIG. 2D  FIG. 2E

WATER PURIFICATION

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to water purification and more particularly to plasmonics-enhanced photocatalysis water purification.

State of Technology

The section provides background information related to the present disclosure which is not necessarily prior art.

There is growing number of contaminants entering water supplies from domestic, industrial, and agricultural activities. Common water contaminants such as polychlorinated biphenyls (PCBs), pesticides, herbicides, phenols, polycylic aromatic hydrocarbons (PAHs), halogenated aromatics, nitrosoamines, pharmaceuticals, and nitrates are known to harm humans and the environment. As a result, there is increasing public health and environmental concerns that drive efforts to decontaminate water (Shannon, M. A., et al. 2008, "Science and technology for water purification in the coming decades," Nature 452: 301-310). Wastewater recycling and reuse is also becoming increasingly important to support US water resources sustainability in face of increasing water scarcity. More effective, lower-cost, robust methods to decontaminate waters from source to point-of-use are needed, without further stressing the environment or endangering human health by the treatment itself.

While there are current water purification technologies such as adsorption, micro/ultra-filtration, and reverse osmosis, these processes require further treatment or disposal of the waste stream brines produced, and they are energy-intensive as high pressure is typically needed to push the water through filter or membrane (Gupta, V. K., et al. 2012, "Chemical treatment technologies for waste-water recycling—an overview," RCS Advances 2: 6380-6388). On the other hand, chemical methods using oxidizing agent such as chlorine, ozone, and hydrogen peroxide combined with ultraviolet (UV) illumination cannot remove inorganics such as nitrates, and toxic by-products such as bromates are often generated. These chemical oxidizing agents are hazardous and they decompose slowly in water, which results in complicated chemicals storage and transport requirements, as well as long water treatment time as the chemical agent needs to fully decompose before the treated water can go on to the next step.

Photocatalysis as a water treatment technology (Chong, M. N., et al. 2010, "Recent developments in photocatalytic water treatment technology: a review," Water Research 44 (10): 2997-3027) is attractive as it can treat wider range of contaminants compared to other chemical oxidation methods, is non-toxic, produces no waste, and no high-pressure pumping is needed. The process can be easily turned on or off through switching on/off the illuminating light. It can also be used in combination with other existing water treatment technologies. The semiconductor titanium dioxide ($TiO_2$) has long been recognized as the best photocatalyst for oxidizing organic pollutants (into non-hazardous species such as $CO_2$) in water (Mills, A., et al. 1993, "Water purification by semiconductor photocatalysis," Chemical Society Reviews, 417-425). By absorbing a photon in the UV range, an electron-hole pair is generated in $TiO_2$. The hole migrates to the $TiO_2$ surface and either directly oxidizes an organic pollutant molecule in contact with the surface, or more generally, reacts with water molecule to produce an OH-ion, which in turn oxidizes dissolved organic molecule. $TiO_2$ is also known to facilitate the removal of nitrates in water through reduction of the nitrates (Shand, M. and J. A. Anderson. 2013, "Aqueous phase photocatalytic nitrate destruction using titania based materials: routes to enhanced performance and prospects for visible light activation," Catal. Sci. Technol. 3:879-881). Photocatalysis is a known method that effectively remove contaminant molecules from water. However, despite its many advantages, its widespread industrial use is nevertheless hindered by its limited quantum efficiency and slow reaction rate—up to >1 day of UV illumination is required to fully decontaminate a decent amount (mLs to Ls) of water.

To alleviate this issue, in our invention we incorporate plasmonics with the $TiO_2$ photocatalyst. Plasmonics makes use of surface plasmons, which are electromagnetic (EM) wave-coupled collections of electron oscillation at metal-dielectric (in our case, water) interface (Maier, S. Plasmonics: Fundamentals and Applications, New York: Springer, 2007). With the correct plasmonic design, two key inter-related features can arise that are relevant to photocatalytic applications: 1.) spectral resonances that allow us to fine-tune the plasmonic spectral response to optimize for a particular application, and 2.) large localized electric field enhancement (Smythe, E. J. et al. 2007, "Optical properties of surface plasmon resonances of coupled metallic nanorods," Opt. Express 15: 7439-7447), resulting in increased photo-absorption by the photocatalyst. Plasmonics is known to drastically enhance other light-matter interaction processes such as Raman scattering by several orders-of-magnitude. Recently, reports began to emerge on evidence of plasmonic enhancement of photocatalysis rate (Honda, M. et al. 2014, "Plasmon-enhanced UV photocatalysis," Appl. Phys. Lett. 104: 061108). However, the plasmonic effect is often limited in these cases as the nanostructures are random and unoptimized. By incorporating patterned UV plasmonic metal nanostructures with $TiO_2$, photocatalysis reaction can potentially be enhanced through two mechanisms: 1.) $TiO_2$ photo-absorption enhancement due to plasmon-generated localized EM field enhancement, and 2.) $TiO_2$ to metal electron transfer that reduces undesirable, efficiency-quenching electron-hole recombination.

While there are emerging photocatalysis enhancing techniques through structural design to increase surface-to-volume ratio, they do not address the fundamental quantum efficiency issue, and are often complex and costly (Paramasivam, I. et al. 2012, "A review of photocatalysis using self-organized $TiO_2$ nanotubes and other ordered oxide nanostructures," Small 8 (20): 3073-3103). The inventor's approach has the benefit of being based on technologies (UV, photocatalysis) already familiar to the water treatment industry, but making significant improvement to it.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed apparatus, systems and methods for enhanced photocatalytic degradation of organic contaminant in water through the incorporation of patterned plasmonic metal nanostructures with a photocatalyst. Currently available photocatalysts can oxidize organic pollutants (into non-hazardous species such as $CO_2$) in water. They are also known to facilitate the removal of inorganics such as nitrates in water. But its wide-spread industrial use is hindered by limited quantum efficiency and slow reaction rate. To alleviate this issue, the inventors used plasmonics, which is known to drastically enhance other light-matter interaction processes such as Raman scattering. Plasmonics makes use of surface plasmons, which are EM wave-coupled collections of electron oscillation at metal-dielectric (in this case, water) interface. By incorporating UV plasmonic metal nanostructures with the photocatalyst, photocatalysis reaction can potentially be enhanced through two mechanisms: 1.) photo-absorption enhancement due to plasmon-generated localized EM field enhancement, and 2.) photocatalyst to metal electron transfer that reduces undesirable, efficiency-quenching electron-hole recombination.

The inventor's apparatus, systems and methods use plasmonic metal nanostructures to enhance photocatalytic degradation of organic contaminants in water. The inventors have reduced the apparatus, systems and methods to practice by successfully showing up to 5× enhancement in reaction rate of photocatalytic decomposition of an organic chemical (methyl orange) dissolved in water, through incorporating a layer of aluminum (Al) plasmonic nanostructures on top of a titanium dioxide ($TiO_2$) thin film photocatalyst. The whole sample was immersed in the solution and illuminated with ultraviolet (UV) light. The plasmonics-induced electromagnetic field enhancement drastically increases photo-absorption and electron-hole pair generation at the catalyst surface, thereby enhancing the redox reactions at the catalyst-water interface that break the dissolved organics into non-toxic by-products such as carbon dioxide ($CO_2$). The inventor's apparatus, systems and methods demonstrate that it is indeed feasible to use plasmonics to enhance photochemical reactions.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIG. 1 is a schematic of plasmonic-photocatalyst operating in the UV wavelength range and used to photo-degrade the organic molecule Methyl Orange.

FIG. 2A illustrates a plasmonic-photocatalyst membrane.

FIG. 2B is a photo micrograph that shows plasmonic nanoparticles or nanostructures connected to the plasmonic-photocatalyst membrane illustrated in FIG. 2A.

FIGS. 2C, 2D, and 2E are enlarged views of individual plasmonic nanoparticles or nanostructures.

DETAILED DESCRIPTION OF SPECIFIC EMBODIMENTS

Figure 3:
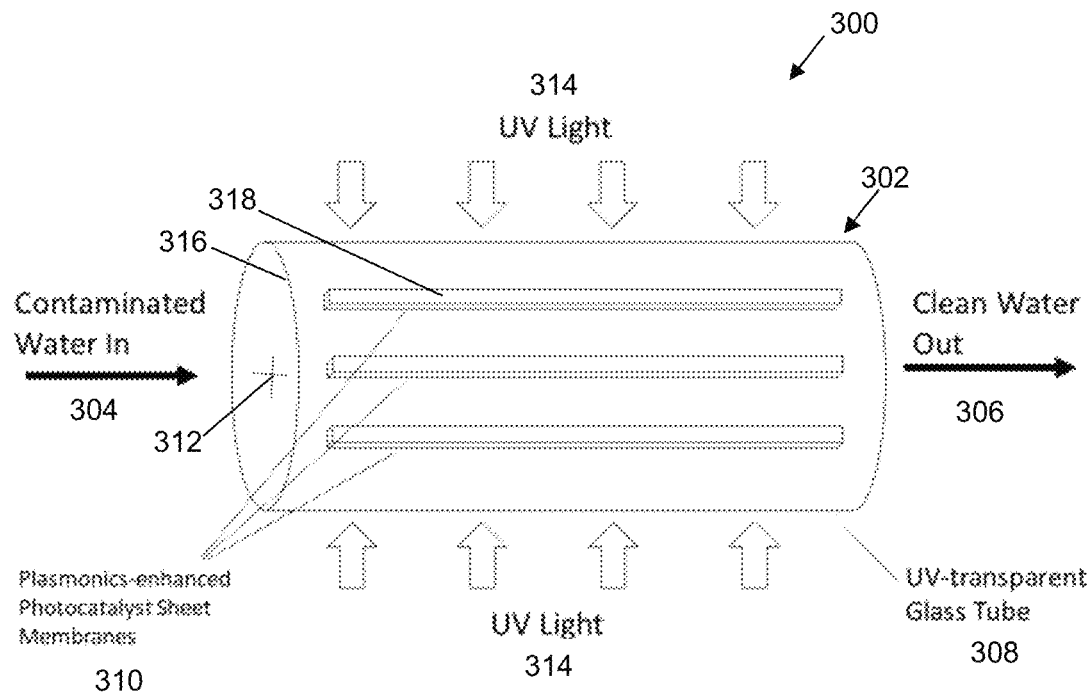
FIG. 3 illustrates a photocatalytic reactor that provides a high flow through of water wherein contaminated water flows into reactor and clean water flows out of reactor.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

In one embodiment the inventors used plasmonic nanostructures designed by finite element method (FEM) simulation using the commercial COMSOL Multiphysics software and fabricated on $TiO_2$ thin film by nanosphere lithography. The inventors then used the fabricated samples in a series of photocatalysis experiments, in which plasmonic-photocatalyst sample was completely immersed in aqueous methyl orange solution, and light from a UV lamp was shone through the solution onto the sample top surface. The kinetics of the reaction was monitored by taking out a small volume of the solution and measuring its concentration using UV-visible photo-spectrometry at regular UV illumination time intervals. The reaction rate was obtained by exponential fitting of the data and compared with controls.

Referring to the drawings and in particular to FIG. 1 an embodiment of the inventor's apparatus, systems and methods is illustrated. This embodiment is designated generally by the reference numeral 100. FIG. 1 shows the structural elements identified and described below.

Reference numeral 102—a quartz substrate,
Reference numeral 104—an anatase $TiO_2$ nanocrystal film on the quartz substrate,
Reference numeral 106—aqueous methyl orange,
Reference numeral 108—a UV light source,
Reference numeral 110—UV light (>388 nm), and
Reference numeral 112—UV plasmonic nanostructures.

The structural elements of the system 100 having been identified and described, the operation of the system 100 will now be considered. A layer of thin anatase $TiO_2$ thin film 104 is deposited onto a quartz substrate 102. The metallic plasmonic nanostructure layer is designed to operate in the wavelength around 350 nm and fabricated on top of the $TiO_2$ thin film. The whole sample is immersed in an aqueous solution of methyl orange 106, and UV light 110 is shone through the solution to illuminate the surface of the sample. Due to the plasmonic resonance, the electromagnetic field is substantially enhanced at localized 'hot spots', leading to increase in photo-absorption in and around these hot spots, which in turn leads to increase in radicals generated on surface of the catalyst around these hot spots, resulting in increase in photocatalysis reaction rate. By accumulating a series of these measurements, the photodegradation kinetics of the methyl orange molecules is recorded. By comparing this data with measurements from a series of control samples of the same area (~6 cm$^2$), photocatalysis enhancement (if any) was determined and quantified.

Though the inventors have implemented a demonstration of their invention with a specific organic contaminant (methyl orange), catalyst ($TiO_2$) and metal material (Al), this methodology can be extended to break down any contaminant (organic or inorganic) susceptible to photocatalytic degradation and to use any photocatalyst known to be effective in water treatment. For example, the inventors are now actively investigating its application in removal of Per-fluoroalkyl substances (PFAS) chemicals. Other plasmonic metal materials such as gold and silver can be utilized.

In addition, the implementation platform can be generalized beyond the periodic nanostructures on catalyst thin film as demonstrated here. For example, it is envisioned that for larger scale implementation, photocatalyst membranes with plasmonic metal nanoparticles dispersed onto them can be used in a water flow-through reactor.

Referring now to FIGS. 2A, 2B, 2C, 2D, and 2E another embodiment of the inventor's apparatus, systems and methods is illustrated. This embodiment is designated generally by the reference numeral 200. FIGS. 2A, 2B, 2C, 2D, and 2E shows the structural elements identified and described below.

Reference numeral 202—a plasmonic-photocatalyst membrane with nanoparticles dispersed on it, and
Reference numeral 204—a ruler that provides an indication of relative size.

The structural elements of the system 200 having been identified and described, the operation of the system 200 will now be considered. A plasmonic-photocatalyst membrane 202 with nanoparticles dispersed on it is illustrated in FIG. 2A. A ruler 204 provides an indication of relative size. FIG. 2B is a photo micrograph that shows plasmonic nanoparticles or nanostructures connected to the plasmonic-photocatalyst membrane illustrated in FIG. 2A. FIGS. 2C, 2D, and 2E are enlarged views of individual plasmonic nanoparticles or nanostructures showing nanoparticles exhibiting plasmonic resonances.

Referring now to FIG. 3 an illustration of another embodiment of the inventor's apparatus, systems and methods is illustrated. This embodiment is designated generally by the reference numeral 300. The embodiment 300 provides a photocatalytic reactor 302 for water purification. The photocatalytic reactor 302 provides a high flow through of water wherein contaminated water 304 flows into reactor 302 and clean water 306 flows out of reactor 302. FIG. 3 shows the structural elements identified and described below.

Reference numeral 302—reactor,
Reference numeral 304—contaminated water,
Reference numeral 306—clean water,
Reference numeral 308—glass tube,
Reference numeral 310—plasmonic-photocatalyst sheet membranes,
Reference numeral 312—long axis of the tube.
Reference numeral 314—UV light,
Reference numeral 316—glass tube wall, and
Reference numeral 318—catalyst surfaces.

The structural elements of the embodiment 300 having been identified and described, the operation of the embodiment 300 will now be considered.

The reactor 302 includes a glass tube 308 with layers of plasmonic-photocatalyst sheet membranes 310 installed in or on it. These sheet membranes 310 are aligned parallel to the long axis 312 of the tube 308. Contaminated water 302 is pumped and flows through the tube 308. When light 314 with the designed wavelength is illuminated through the glass tube wall 316 and onto the catalyst surfaces 318, it initiates a series of redox reactions, eventually leading to the decomposition of contaminants in the water into non-toxic molecules (such as $CO_2$), and clean water 304 flows out of the tube 308.

Figure 4:
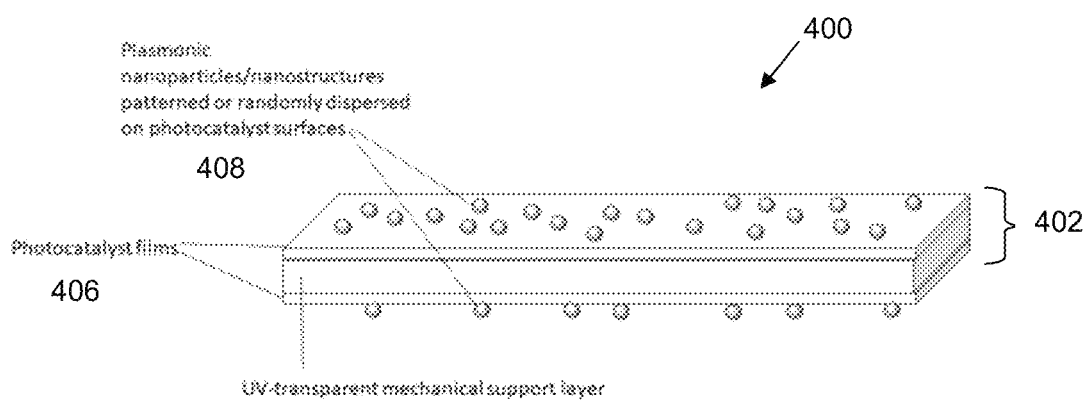
FIG. 4 is an illustration showing the series of redox reactions of the embodiment 300 of FIG. 3.

Referring now to FIG. 4 an illustration shows the series of redox reactions of the embodiment 300. The illustration is designated generally by the reference numeral 400. FIG. 4 shows the structural elements identified and described below.

Reference numeral 402—plasmonic-photocatalyst sheet membranes illustrated in FIG. 3,
Reference numeral 404—mechanical support layer (UV transparent),
Reference numeral 406—photocatalyst material, and
Reference numeral 408—plasmonic nanoparticles or nanostructures.

Details of one implementation of the plasmonic-photocatalyst sheet membranes 402 are depicted in FIG. 4. Thin layers of photocatalyst material 406 are deposited or grown on both sides of a mechanical support layer 404 that is transparent to the illuminating light. A specific example of photocatalyst sheet membranes is $TiO_2$ wire mesh sheets. $TiO_2$ has long been recognized as the best photocatalyst for oxidizing organic pollutants in water. It is also known to facilitate the removal of nitrates in water through reduction of the nitrates. These mesh sheets are readily available commercially at sizes up to 1×2 meters per sheet. These sheets are also flexible. On the surface of these photocatalyst films 402, plasmonic nanoparticles or nanostructures 408 are controllably patterned or randomly dispersed. These nanostructures 408 are designed to be in resonance with the illuminating light wavelength, such that the photo-decomposition reaction rate and energy efficiency are enhanced as compared to plasmonics-free photocatalyst. The plasmonic-photocatalyst sheet membranes 402 lead to the decomposition of contaminants in the water into non-toxic molecules (such as $CO_2$), and clean water flows out of the tube of the reactor.

The inventors' apparatus, systems, and methods provide an apparatus for producing decontaminated water from contaminated water that includes a vessel, an inlet to the vessel wherein the contaminated water is introduced into the vessel, an outlet to the vessel wherein the decontaminated water is removed from the vessel, a plasmonic-photocatalyst membrane connected to the vessel, plasmonic nanoparticles or nanostructures connected to the plasmonic-photocatalyst membrane, and a source of ultraviolet light that directs ultraviolet light onto the vessel, the plasmonic-photocatalyst membrane, the plasmonic nanoparticles or nanostructures, and the contaminated water to produce the decontaminated water from the contaminated water. The inventors' apparatus, systems, and methods also provide a method of producing decontaminated water from contaminated water including the steps of providing a vessel with an inlet to the vessel and an outlet to the vessel wherein the contaminated water is introduced into the vessel by the inlet and the decontaminated water is removed from the vessel by the outlet, connecting a plasmonic-photocatalyst membrane to the vessel, providing plasmonic nanoparticles or nanostructures connected to the plasmonic-photocatalyst membrane, directing ultraviolet light onto the plasmonic-photocatalyst membrane, the nanoparticles or nanostructures, and the contaminated water to produce decontaminated water from contaminated water.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for producing decontaminated water from contaminated water, comprising:
   a glass tube,
   a central long axis of said glass tube,
   an inlet to said glass tube wherein the contaminated water is introduced into said glass tube,
   an outlet to said glass tube wherein the decontaminated water is removed from said glass tube,
   plasmonic-photocatalyst membrane layers positioned parallel to said central long axis of said glass tube and located on or in said glass tube,
   plasmonic nanoparticles or nanostructures connected to said plasmonic-photocatalyst membrane layers, and
   a source of ultraviolet light that directs ultraviolet light onto said glass tube, said plasmonic-photocatalyst membrane layers, said plasmonic nanoparticles or nanostructures, and the contaminated water to produce the decontaminated water from the contaminated water.

2. The apparatus of claim 1 wherein said plasmonic-photocatalyst membrane layers include an anatase $TiO_2$ film layer on an ultraviolet light transparent mechanical support layer and a methyl orange film on said anatase $TiO_2$ film layer.

3. The apparatus of claim 2 wherein said plasmonic nanoparticles or nanostructures are located on said methyl orange film on said ultraviolet light transparent mechanical support layer on said glass tube and layers of said plasmonic-photocatalyst membrane layers on said ultraviolet light transparent mechanical support layer.

4. The apparatus of claim 1 wherein said plasmonic nanoparticles or nanostructures are in resonance with said ultraviolet light.

5. The apparatus of claim 1 wherein said plasmonic nanoparticles or nanostructures are controllably patterned on said plasmonic-photocatalyst membrane layers.

6. The apparatus of claim 1 wherein said plasmonic nanoparticles or nanostructures are randomly dispersed on said plasmonic-photocatalyst membrane layers.

7. The apparatus of claim 1 wherein said source of ultraviolet light is a source of 350 nm ultraviolet light.

8. An apparatus for producing decontaminated water from contaminated water, comprising:
   a cylindrical glass tube,
   a central long axis of said cylindrical glass tube,
   an inlet to said cylindrical glass tube wherein the contaminated water is introduced into said cylindrical glass tube,
   an outlet to said cylindrical glass tube wherein the decontaminated water is removed from said cylindrical glass tube,
   plasmonic-photocatalyst membrane layers positioned parallel to said central long axis of said cylindrical glass tube and located on or in said cylindrical glass tube wherein said plasmonic-photocatalyst membrane layers include an anatase $TiO_2$ film layer on an ultraviolet light transparent mechanical support layer and a methyl orange film on said anatase $TiO_2$ film layer,
   plasmonic nanoparticles or nanostructures connected to said plasmonic-photocatalyst membrane layers wherein said plasmonic nanoparticles or nanostructures are located on said methyl orange film, and
   a source of ultraviolet light that directs ultraviolet light onto said cylindrical glass tube, said plasmonic-photocatalyst membrane layers, said plasmonic nanoparticles or nanostructures, and the contaminated water to produce the decontaminated water from the contaminated water.

\* \* \* \* \*